United States Patent
Kusuda et al.

(10) Patent No.: US 8,116,501 B2
(45) Date of Patent: Feb. 14, 2012

(54) HEADSET

(75) Inventors: Daisuke Kusuda, Yao (JP); Yoshito Fujimoto, Yao (JP); Hiroyoshi Shinozuka, Yao (JP)

(73) Assignee: Hosiden Corporation, Osaka (JP)

( * ) Notice: Subject to any disclaimer, the term of this patent is extended or adjusted under 35 U.S.C. 154(b) by 179 days.

(21) Appl. No.: 12/444,060

(22) PCT Filed: Jun. 22, 2007

(86) PCT No.: PCT/JP2007/062567
§ 371 (c)(1),
(2), (4) Date: Nov. 30, 2009

(87) PCT Pub. No.: WO2008/041396
PCT Pub. Date: Apr. 10, 2008

(65) Prior Publication Data
US 2010/0098285 A1   Apr. 22, 2010

(30) Foreign Application Priority Data

Oct. 3, 2006   (JP) ................................ 2006-272032

(51) Int. Cl.
*H04R 25/00* (2006.01)
(52) U.S. Cl. ...................................... 381/380; 381/374
(58) Field of Classification Search .................. 379/430; 381/370, 374, 376, 380, 381, 383
See application file for complete search history.

(56) References Cited

U.S. PATENT DOCUMENTS

| 5,544,253 A | 8/1996 | Nagayoshi et al. |
| 5,606,607 A * | 2/1997 | Yamaguchi et al. ........... 379/430 |
| 6,868,284 B2 * | 3/2005 | Bae ............................... 381/376 |
| 7,289,640 B2 * | 10/2007 | Tsai et al. ..................... 381/380 |

FOREIGN PATENT DOCUMENTS

| CN | 1115167 A | 1/1996 |
| JP | 02278998 A | 11/1990 |
| JP | 09065476 A | 3/1997 |
| JP | 3105934 U | 9/2004 |
| JP | 2005328118 A | 11/2005 |

* cited by examiner

*Primary Examiner* — Brian Ensey
(74) *Attorney, Agent, or Firm* — The Webb Law Firm

(57) ABSTRACT

A headset comprising a body portion including a microphone section, a receiver section, a battery section and a wireless communication section, all provided in a case having a substantially flat surface, and a projecting portion projecting from the substantially flat surface, is arranged such that the ear pad of the receiver section attached to the tip of the projecting portion is inserted into the external auditory meatus. A portion coming into resilient contact with the inner wall of the cavity of the concha on the inside of a tragus and an antitragus is provided at the projecting portion closer to the body portion side than the ear pad, wherein the ear pad is of an earplug type deformable elastically to ensure a close contact with the inner wall of the external auditory meatus.

3 Claims, 4 Drawing Sheets

[Fig 1]
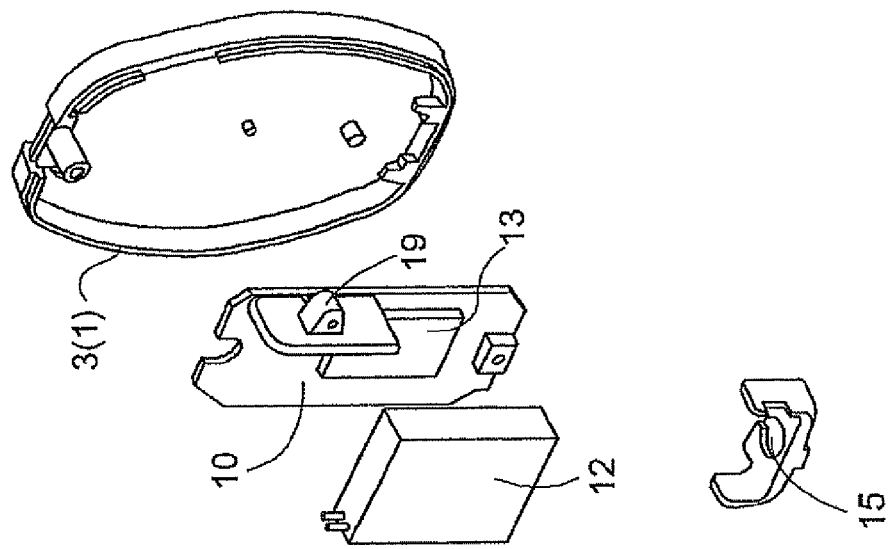
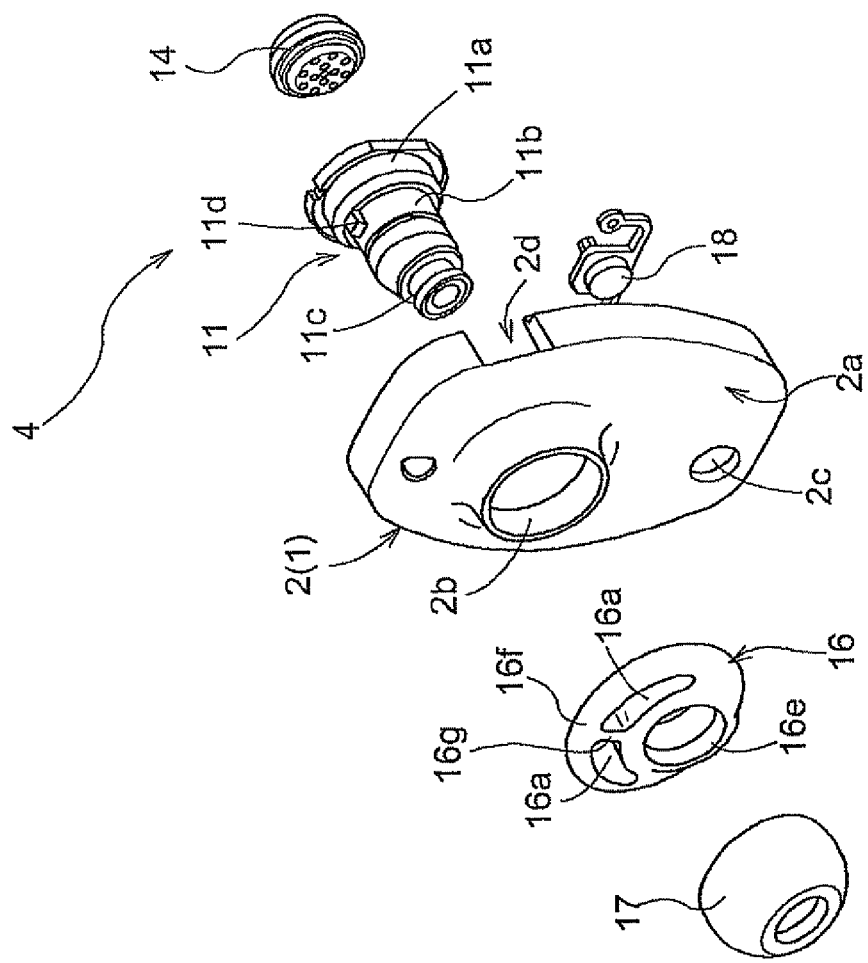

[Fig 2]
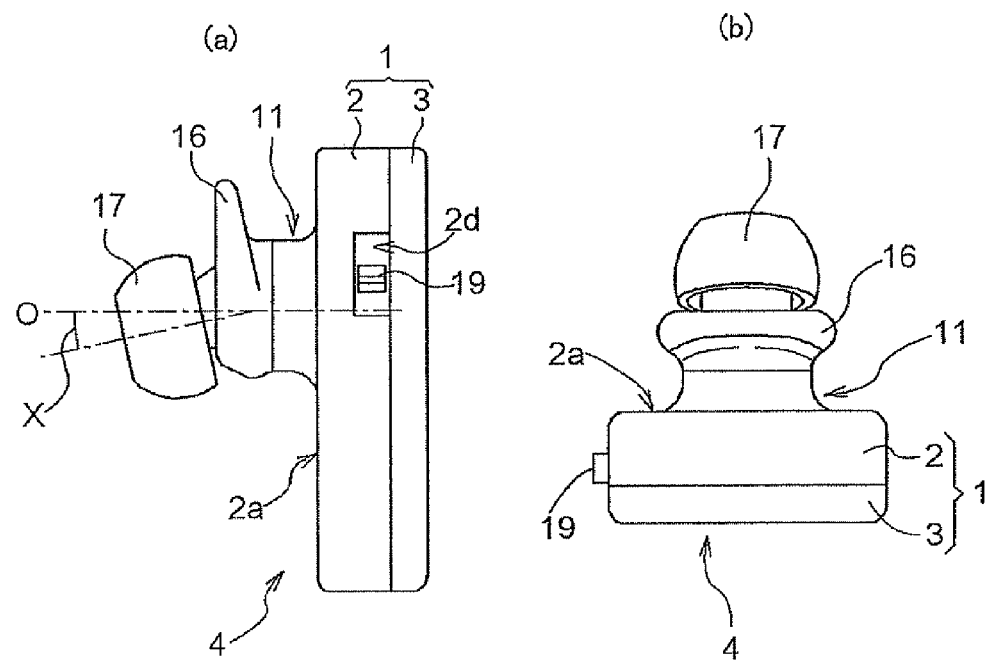
[Fig 3]
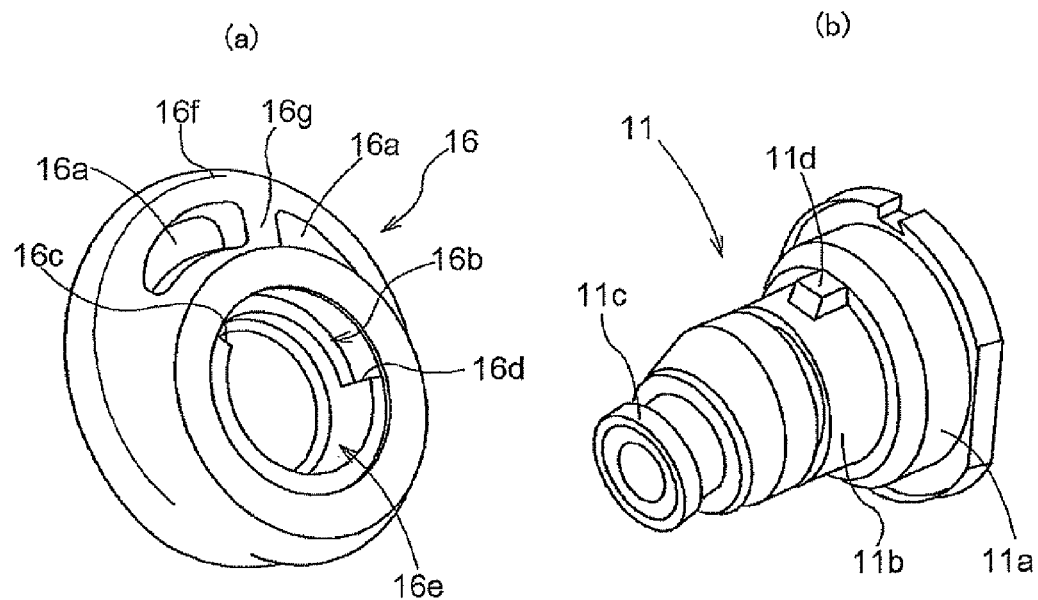

[Fig 4]
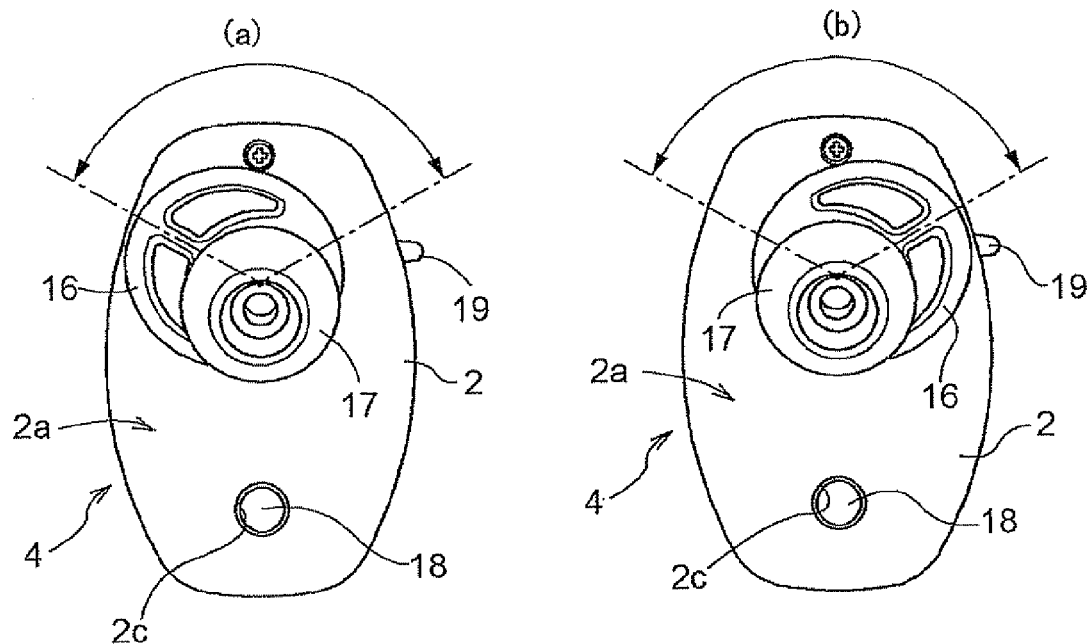
[Fig 5]
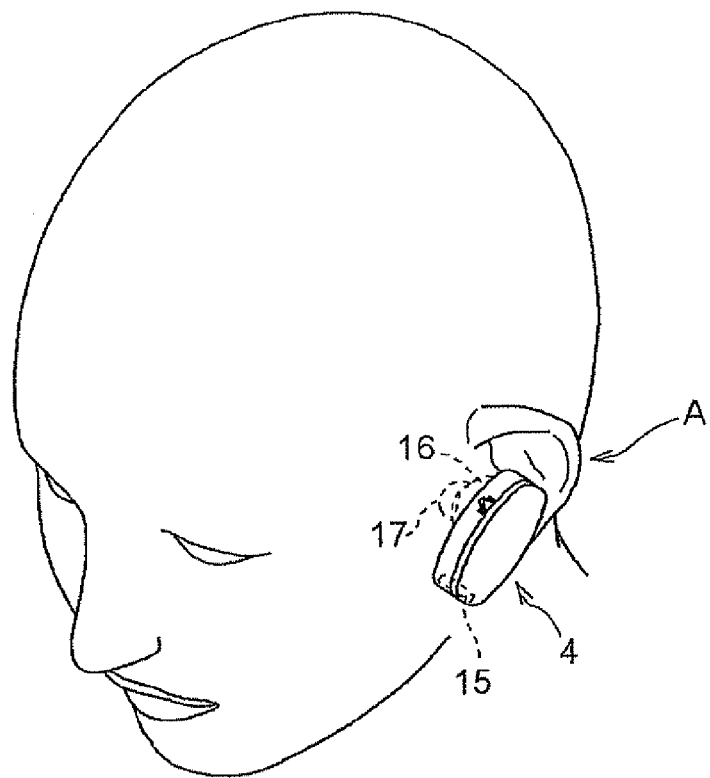

[Fig 6]
(a)
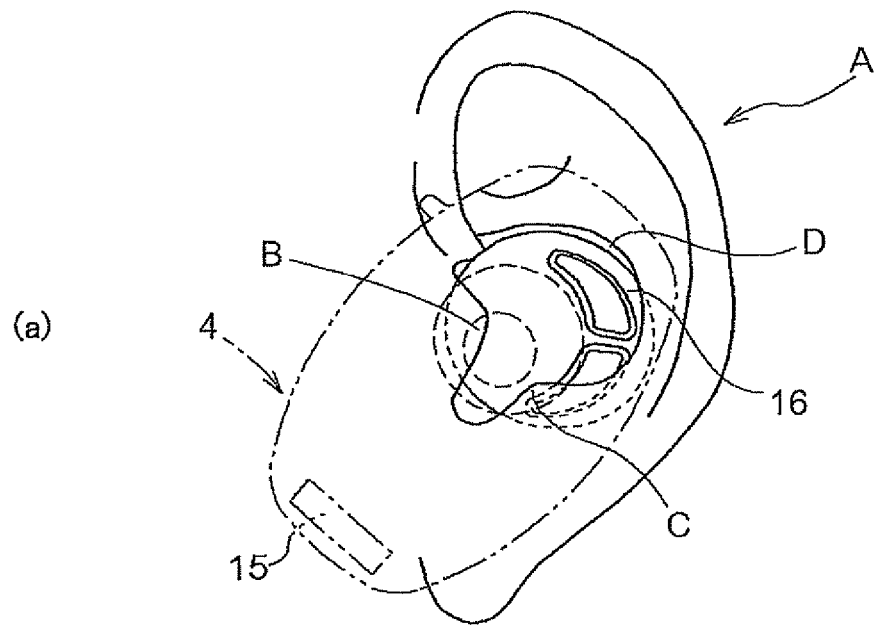
(b)
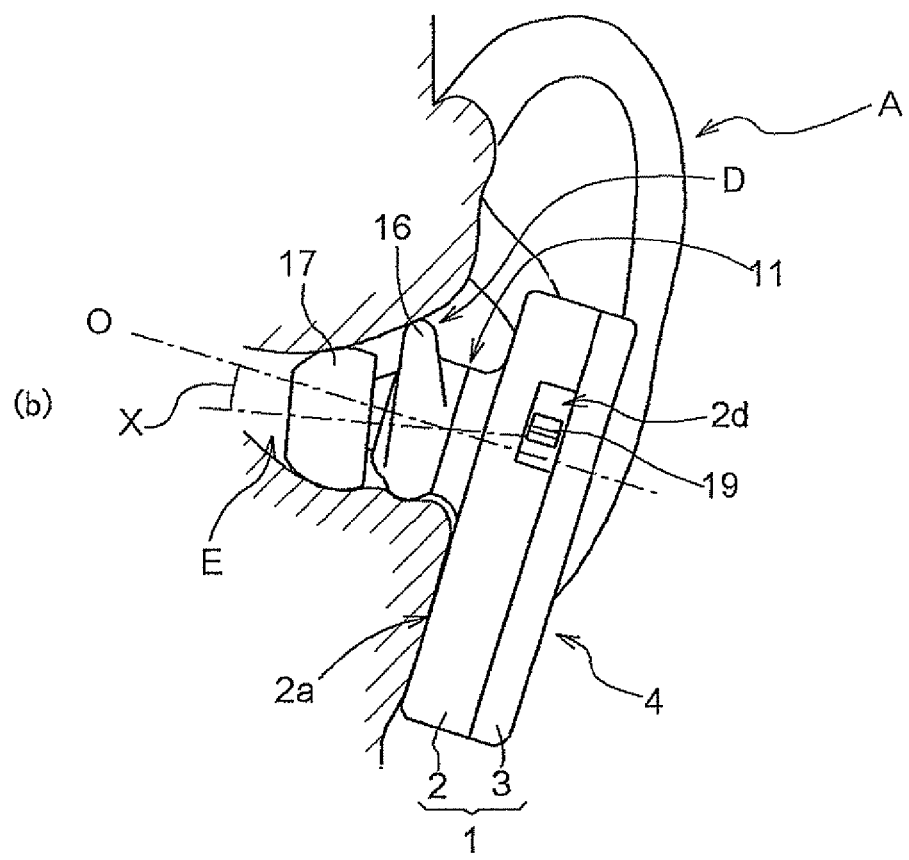

HEADSET

TECHNICAL FIELD

The present invention relates to a headset comprising a casing with a generally flat surface, the casing including a main body section having a microphone section, a receiver section, a battery section and a wireless communication section, and a projecting portion projecting from the generally flat portion and having a distal end portion for receiving an ear pad section of the receiver section to allow the ear pad section to be inserted into an external auditory meatus.

BACKGROUND ART

A telephone headset allowing hands-free communication by means of a mobile phone, for example, has been proposed. In particular, a wireless headset is provided using short-distance wireless communication technology such as Bluetooth™ technology. For example, Patent Document 1 discloses a headset comprising a casing with a generally flat surface, the casing including a main body section having a microphone section, a receiver section, a battery section and a wireless communication section, and a projecting portion projecting from the generally flat portion. An ear pad section of the receiver section is attached to a distal end portion of the projecting portion and placed in a cavity of a concha. Such an arrangement of the wireless headset results in a heavy device with numerous parts including the microphone section, receiver section, battery section and wireless communication section. With the headset disclosed in Patent Document 1, the ear pad section is engaged with an inner wall of a cavity of a concha of a tragus and an antitragus, which prevents the headset from easily falling off the auricle.

Patent Document 1: Japanese Utility Model Registration No. 3105934

DISCLOSURE OF THE INVENTION

Problem to be Solved by the Invention

With the headset disclosed in Patent Document 1, since the ear pad section is engaged with an inner wall of a cavity of a concha of a tragus and an antitragus, an external auditory meatus is not perfectly shut by the ear pad, but a large gap is produced therein. As a result, audio sound reproduced in the receiver section easily leaks to the outside of the ear pad section while audio sound entering from the outside is sufficiently shut by the ear pad section. More particularly, it is difficult for the user to hear the audio sound reproduced in the receiver. When the ear pad section disclosed in Patent Document 1 is attached to the auricle, it is not necessarily engaged with the receiver section as directed toward external auditory meatus, which leads to a possibility that the user hears the audio sound with difficulty.

Here, it is conceivable that the ear pad section is modified to be the earplug type that is elastically deformable to come into tight contact with the inner wall of the external auditory meatus. In that case, however, it would be difficult for the ear pad section to solely prevent the heavy headset from falling off the auricle. Particularly, when the user moves his or her head with the headset attached to the auricle, the headset will easily fall off.

The present invention has been made having regard to the above-noted problem, and its object is to provide a headset capable of being attached to an auricle reliably and allowing the user to hear audio sound reproduced in a receiver section satisfactorily.

Means for Solving the Problem

In order to achieve the above-noted object, a characteristic feature of a headset of the present invention lies in comprising a casing with a generally flat surface, the casing including a main body section having a microphone section, a receiver section, a battery section and a wireless communication section, and a projecting portion projecting from the generally flat portion and having a distal end portion for receiving an ear pad section of the receiver section to allow the ear pad section to be inserted into an external auditory meatus, wherein an engaging section is provided in the projecting portion at a position closer to the main body section than the ear pad section to be elastically engageable with an inner wall of a cavity of a concha inward of a tragus and an antitragus, and wherein the ear pad section is a earplug type that is elastically deformable to come into tight contact with an inner wall of the external auditory meatus.

With the above-noted arrangement, the ear pad section is the earplug type, which prevents the audio sound from leaking to the outside easily and shuts off the audio sound entering the external auditory meatus from the outside sufficiently. The main body section includes the microphone section, receiver section, battery section and wireless communication section, which makes the entire device heavy. However, the engaging portion is provided in the projecting portion at the position closer to the main body section than the ear pad section for being elastically engaged with an inner wall of the cavity of the concha inward of the tragus and the antitragus, which prevents the headset from falling off the auricle while the ear pad section remains inserted in and in tight contact with the external auditory meatus. Further, since it is the generally flat surface of the main body section that contacts the auricle or cheek of the user, the headset stably contacts the auricle or cheek of the user.

Therefore, the headset capable of being attached to an auricle reliably and allowing the user to hear audio sound reproduced in a receiver section satisfactorily is provided.

Another characteristic feature of the headset of the present invention lies in that the engaging portion and the projecting portion are relatively rotatable, and wherein the engaging portion has a rotational axis eccentric from a center of the engaging portion.

With the above-noted arrangement, the engaging portion bulges in one direction from the rotational axis as its shape is observed with reference to the rotational axis. More particularly, the ear pad section is allowed to come into tight contact with the inner wall of the external auditory meatus while the engaging portion bulging from the rotational axis in one direction is allowed to be elastically deformed and pressed against the inner wall of the cavity of the concha. Here, since the engaging portion and the projecting portion are relatively rotatable, the engaging portion is rotated to a position to sufficiently come into tight contact with the inner wall of the cavity of the concha according to the shape of the inner wall of the cavity of the concha, while the ear pad section remains inserted in the external auditory meatus.

A further characteristic feature of the headset of the present invention lies in that the engaging portion includes a hollow portion formed therein at a position other than an outer edge portion.

With the above-noted arrangement, due to the hollow portion, the engaging portion is elastically deformable with ease to fit the shape of the inner wall of the cavity of the concha when coming into tight contact with the inner wall of the cavity of the concha. As a result, the engaging portion is brought into tight contact with the inner wall of the cavity of the concha satisfactorily. Further, it provides the user with good comfort in wearing the headset with the engaging portion inserted into the cavity of the concha.

A still further characteristic feature of the headset of the present invention lies in that the projecting portion is bent.

With the above-noted arrangement, since the projecting portion is bent, the center axis of the ear pad section is inclined toward the generally flat surface to form a small angle between the center axis of the ear pad section and the generally flat surface. Thus, the generally flat surface of the casing adequately contacts the auricle or cheek of the user while the ear pad section is inserted into and in tight contact with the external auditory meatus. This allows the headset to be stably attached to the auricle.

BEST MODE FOR CARRYING OUT THE INVENTION

A headset in accordance with the present invention will be described hereinafter in reference to the accompanying drawings.

FIG. 1 is an exploded perspective view of the headset. FIG. 2(a) is a side view of the headset, and FIG. 2(b) is a top plan view of the headset. As shown in FIGS. 1 and 2, the headset comprises a casing 1 with a generally flat surface 2a including a main body section 4 having a microphone section 15, a receiver section 14, a battery section 12, and a wireless communication section 13. An audio signal received from the outside through the wireless communication section 13 is outputted using the receiving section 14 while an audio sound received using the microphone section 15 is converted to an audio signal and outputted to the outside through the wireless communication section 13. The wireless communication section 13 allows wireless communications with an external device using short-distance wireless communication technology such as Bluetooth™ technology.

The casing 1 having the main body section 4 includes a first member 2 and a second member 3. The casing 1 is formed by assembling the first member 2 and the second member 3 together to accommodate the above-noted various parts. In this embodiment, the generally flat surface 2a of the casing 1 has a shape similar to an ellipse or rectangle. In addition to the microphone section 15, receiver section 14, battery section 12 and wireless communication section 13 noted above, the casing 1 also accommodates a power switch section 18, a volume control switch section 19 and a board assembly 10. It should be noted that the microphone section 15 is accommodated in the casing 1 at an end portion remote from the end portion adjacent to the power switch section 18 where a through bore 2b for receiving the receiver section is formed. When the user turns on the power switch section 18 of the push-button type, the headset is switched to an operative state by power supplied from the battery. When the user turns off the power switch section 18, the headset is switched to an inoperative state.

When the wireless communication section 13 receives an audio signal from the outside in the operative state of the headset, the audio signal is arithmetically processed by a processing unit (not shown) mounted on the board assembly 10, for example. Then, the audio signal is converted to an audio sound in the receiver section 14 for output. When the microphone section 15 receives an audio sound generated by the user, for example, and converts the same to an audio signal, the audio signal is arithmetically processed by the processing unit (not shown) mounted on the board assembly 10, for example. Then, the audio signal is transmitted to the outside by the wireless communication section 13.

A cutout portion 2d is formed in a side surface of the first member 2 of the casing 1. As the first member 2 and the second member 3 are assembled together, the volume control switch section 19 is arranged in the cutout portion 2d to be connected to the board assembly 10. The sound volume outputted from the receiver section 14 varies with control of the volume control switch section 19 by the user.

The headset further comprises a receiver joint 11 acting as a projecting section projecting to the outside from the generally flat surface 2a through the through bore 2b. The receiver joint 11 forms part of the receiver section 14 and includes a proximal portion 11a positioned within the casing 1, an intermediate portion 11b, and a distal end portion 11c. The intermediate portion and the distal end portion project to the outside from the casing 1. The proximal portion 11a is fitted into the through bore 2b for the receiver section from the inside of the casing 1, whereby the receiver joint 11 is fixed to the main body section 4. In this embodiment, the through bore 2b for the receiver section is formed in the generally flat surface 2a at an end portion with respect to a longitudinal axis thereof. On the other hand, a through bore 2c for receiving the power switch section 18 is formed in the generally flat surface 2a at the other end portion with respect to the longitudinal axis thereof that is remote from the end portion where the through bore 2b for the receiver section is formed. The power switch section 18 is exposed to the outside from the inside of the casing 1 through the through bore 2c for the power switch section.

The receiver section 14 for outputting audio sounds as noted above is provided in the proximal portion 11a of the receiver joint 11. An ear pad section 17 is attached to the distal end portion 11c of the receiver joint 11. The ear pad section 17 is made of a resin material such as elastomer that is the earplug type (canal type) coming into tight contact with an inner wall of an external auditory meatus when inserted into the external auditory meatus.

The receiver joint 11 has an engaging section 16 provided at the intermediate portion 11b, that is, at a portion closer to, the main body section 4 than the ear pad section 17 for being elastically engaged with an inner wall of the cavity of the concha inward of (closer to the external auditory meatus than) the tragus and antitragus. The engaging section 16 is formed of a resin material such as elastomer.

FIG. 3 shows detailed constructions of the engaging section 16 and the receiver joint 11 for allowing the engaging section 16 and the receiver section 11 to be relatively rotatable. FIG. 4 shows rotating states of the engaging section 16. As shown in FIG. 4, the engaging section 16 and the receiver joint 11 are relatively rotatable. More particularly, as shown in FIGS. 2 and 3, a through bore 16e is formed in a position eccentric from the center of the engaging section 16. The center of the through bore 16e serves as a rotational axis O of the engaging section 16. The receiver joint 11 is inserted into the through bore 16e to allow the through bore 16e of the engaging section 16 to be assembled to the intermediate portion 11b of the receiver joint 11 to be slidably rotatable with each other.

Also, a rib 11d is formed on part of the outer peripheral surface of the intermediate portion 11b of the receiver joint 11. Further, a groove 16b having opposite end surfaces defined by stoppers 16c and 16d is formed in part of the inner peripheral surface of the through bore 16e of the engaging section 16. When the engaging section 16 and the receiver joint 11 are assembled together, the rib 11*d* of the receiver joint 11 is fitted in the groove 16*b* of the engaging section 16. The engaging section 16 is relatively rotatable until the stopper 16*c* or 16*d* comes into contact with the rib 11*d*. More particularly, the rib 11*d* of the receiver joint 11 is slidable within the groove 16*b* of the engaging section 16, with the sliding range thereof limited by the stoppers 16*c* and 16*d*.

As noted above, the engaging section 16 and the receiver joint 11 are relatively rotatable. The range of relative rotation is limited to a predetermined range. In this embodiment, the engaging section 16 and the receiver joint 11 are relatively rotatable through about 60 degrees counterclockwise as shown in FIG. 4(*a*) and through about 60 degrees clockwise as shown in FIG. 4(*b*), that is, rotatable through an angular range of about 120 degrees in total. Thus, this headset is attachable to either of the right ear and left ear of the user. More particularly, the engaging section 16 may be rotated counterclockwise as shown in FIG. 4(*a*) when the headset is attached to the left ear, while being rotated clockwise as shown in FIG. 4(*b*) when the headset is attached to the right ear. Further, it should be noted that frictional resistance is produced between the rib 11*d* of the receiver joint 11 and the groove 16*b* of the engaging section 16. The frictional resistance restrains the relative rotation between the receiver joint 11 and the engaging section 16.

As described above, the rotational axis O of the engaging section 16 is located in a position eccentric from the center of the engaging section 16. To be more specific, the engaging section 16, when its configuration is viewed with reference to the rotational axis O, has a shape bulging in one direction from the rotational axis O. This means that the engaging section 16 bulging in one direction is pressed on the inner wall of the cavity of the concha. The engaging section 16 has a hollow portion 16*a* formed in a bulging portion 16*f* and extending from the front side to the back side of the engaging section 16. Since the hollow portion 16*a*, particularly a plurality of the hollow portions 16*a* are formed in the engaging section 16 other than an outer edge portion thereof, the engaging section 16 is easily deformable into a shape that allows the engaging section to come into tight contact with the inner wall of the cavity of the concha. In addition, the engaging section 16 preferably has a connecting support portion 16*g* between the plurality of hollow portions 16*a* as shown. The connecting support portion 16*g* functions to prevent excessive deformation and a reduction in elasticity caused by time deterioration of the bulging portion 16*f* of the engaging section 16. Thus, the engaging section 16 maintains an elastic contact engaging force favorably when inserted into the cavity of the concha. As a result, the engaging section 16 is elastically deformed to come into contact and engagement with the inner wall of the cavity of the concha without impairing a sense of fitness of the engaging section 16 to the cavity of the concha. It should be noted that the outer shape of the engaging section 16 can be varied as appropriate as long as the engaging section elastically contacts and engages the inner wall of the cavity of the concha further inward than the tragus and the antitragus.

FIG. 5 is an explanatory view showing a state where the user wears the headset. FIG. 6(*a*) is a side view showing the position of the engaging section 16 when the headset is attached to the auricle A, while FIG. 6(*b*) is a partially sectional view showing positions of the ear pad section 17, engaging section 16, receiver joint 11 and main body section 4 when the headset is attached to the auricle A. As shown in FIGS. 5 and 6, when the headset of the present invention is attached to the auricle A, the ear pad section 17 of the earplug type is inserted to come into tight contact with the inner wall of the external auditory meatus E, and the engaging section 16 elastically contacts and engages the inner wall of the cavity of the concha D inward of the tragus B and the antitragus C (to the side of the external auditory meatus E). Since the ear pad section 17 is the earplug type, sounds do not easily leak to the outside while sounds from the outside are sufficiently blocked. The main body section 4 is rather heavy because it accommodates the microphone section 15, receiver section 14, battery section 12 and wireless communication section 13. However, the engaging section 16 is provided to elastically contact and engage the inner wall of the cavity of the concha D inward of the tragus B and antitragus C, which allows the ear pad section 17 to remain inserted in the external auditory meatus E, thereby preventing the headset from falling off the auricle A.

Further, since the engaging portion 16 is rotatable relative to the receiver joint 11, it is rotated to a position to sufficiently come into tight contact with the inner wall of the cavity of the concha D according to the shape of the inner wall of the cavity of the concha D, while the ear pad section 17 remains inserted in the external auditory meatus E. Also, the receiver joint 11 and main body section 4 are rotatable relative to the engaging portion 16. Hence, the receiver joint 11 and the main body section 4 can be rotated by small degrees to direct the microphone section 15 accommodated in the end portion of the main body section 4 toward the mouth of the user while the ear pad section 17 and the engaging portion 16 are normally placed and maintained within the external auditory meatus E and the cavity of the concha D, thereby adequately collecting the sounds produced by the user.

Moreover, according to this embodiment, the through bore 2*b* for receiving the receiver section is formed in the generally flat surface 2*a* at the end portion with respect to the longitudinal axis thereof. More particularly, with reference to the through bore 2*b* for receiving the receiving section, the generally flat surface 2*a* bulges in one direction from the through bore 2*b*. The bulging portion adequately comes into contact with the auricle A or cheek of the user, which ensures a stable attachment of the headset to the auricle A.

As illustrated in FIG. 1, FIG. 2(*a*) and FIG. 6(*b*), since the receiver joint 11 is bent, the rotational axis O of the engaging portion 16 is at an angle to the center axis of the ear pad section 17, both of which are attached to the receiver joint 11. More particularly, the rotational axis O of the engaging portion 16 is substantially vertical to the generally flat surface 2*a* while the center axis of the ear pad section 17 is inclined toward the generally flat surface 2*a* to form an angle less than 90 degrees between the center axis of the ear pad section 17 and the generally flat surface 2*a*. In this embodiment, an angle of inclination X formed between the rotational axis O of the engaging portion 16 and the center axis of the ear pad section 17 is set to approximately 12 degrees. With this arrangement, as shown in FIG. 6(*b*), the generally flat surface 2*a* of the casing 1 adequately contacts the auricle A or cheek of the user while the ear pad section 17 attached to the distal end portion 11*c* of the receiver joint 11 is inserted into and in tight contact with the external auditory meatus E.

Modified Embodiments

<1>

In the above-described embodiment, the engaging section 16 and the receiver joint 11 are relatively rotatable through 60 degrees counterclockwise as shown in FIG. 4(*a*) and through 60 degrees clockwise as shown in FIG. 4(*b*), that is, rotatable in an angular range of 120 degrees in total. The angular range of relative rotation may varied as appropriate by changing the shape of the groove 16b formed in the engaging portion 16, for example.

<2>

In the above-described embodiment, the hollow portion 16a is formed to extend through the engaging portion 16. Instead, a hollow portion 16a having any other shape may be formed. For example, a recess-shaped hollow portion may be formed in the bulging portion 16f of the engaging portion 16 so as not to extend through the bulging portion, thereby allowing the engaging portion to be elastically deformed easily. Further, the number of hollow portions 16a and the number of connecting support portions 16g formed in the engaging portion 16 may be varied as appropriate.

<3>

In the above-described embodiment, the receiver joint 11 is bent so that the angle of inclination between the rotation axis O of the engaging portion 16 and the center axis of the ear pad section 17 is approximately 12 degrees. The angle of inclination may be varied as appropriate. Also, the bend degree of the receiver joint 11 may be selected or varied by the user.

INDUSTRIAL UTILITY

The present invention may be applied to a telephone headset allowing hands-free communication in a mobile phone or an internet telephone using a computer terminal, for example.

BRIEF DESCRIPTION OF THE DRAWINGS

FIG. 1 is an exploded perspective view of a headset;
FIG. 2(a) is a side view of the headset;
FIG. 2(b) is a top plan view of the headset;
FIG. 3(a) shows a detailed construction of an engaging portion;
FIG. 3(b) shows a detailed construction of a projecting portion;
FIG. 4 shows rotating states of the engaging portion;
FIG. 5 is an explanatory view showing a state in which the user wears the headset;
FIG. 6(a) is a side view showing a position of the engaging portion when the user wears the headset; and
FIG. 6(b) is a partial sectional view showing positions of the engaging portion, the projecting portion, and a main body section when the user wears the headset.

DESCRIPTION OF THE REFERENCE SIGNS 1 casing
2a generally flat surface
4 main body section
11 receiver joint
11c distal end portion
12 battery section
13 wireless communication section
14 receiver section
15 microphone section
16 engaging portion
16a hollow portion
17 ear pad section
O rotational axis

The invention claimed is:

1. A headset comprising a casing with a generally flat surface, the casing including:
    a main body section having a microphone section, a receiver section, a battery section and a wireless communication section, and
    a projecting portion projecting from the generally flat portion and having a distal end portion for receiving an ear pad section of the receiver section to allow the ear pad section to be inserted into an external auditory meatus,
    wherein an engaging section is provided in the projecting portion at a position closer to the main body section than the ear pad section to be elastically engageable with an inner wall of a cavity of a concha inwardly of a tragus and an antitragus,
    wherein the ear pad section is an earplug type that is elastically deformable to come into tight contact with an inner wall of the external auditory meatus,
    wherein the engaging portion and the projecting portion are relatively rotatable, and
    wherein the engaging portion has a rotational axis eccentric from a center of the engaging portion.

2. The headset as claimed in claim 1, wherein the engaging portion includes a hollow portion formed therein at a position other than an outer edge portion.

3. The headset as claimed in claim 1, wherein the projecting portion is bent.

* * * * *